United States Patent
Ping et al.

(10) Patent No.: US 10,466,923 B2
(45) Date of Patent: Nov. 5, 2019

(54) MODULAR NON-VOLATILE FLASH MEMORY BLADE

(71) Applicant: Samsung Electronics Co., Ltd., Suwon-si, Gyeonggi-do (KR)

(72) Inventors: Zhan Ping, Milpitas, CA (US); Harry Rogers, Sunnyvale, CA (US)

(73) Assignee: SAMSUNG ELECTRONICS CO., LTD. (KR)

(*) Notice: Subject to any disclaimer, the term of this patent is extended or adjusted under 35 U.S.C. 154(b) by 287 days.

(21) Appl. No.: 14/918,554

(22) Filed: Oct. 20, 2015

(65) Prior Publication Data

US 2016/0255740 A1 Sep. 1, 2016

Related U.S. Application Data

(60) Provisional application No. 62/126,367, filed on Feb. 27, 2015.

(51) Int. Cl.
*G06F 3/06* (2006.01)
*G06F 13/362* (2006.01)
(Continued)

(52) U.S. Cl.
CPC .......... *G06F 3/0647* (2013.01); *G06F 1/16* (2013.01); *G06F 13/362* (2013.01);
(Continued)

(58) Field of Classification Search
CPC ...... G06F 3/0647; G06F 3/061; G06F 3/0629; G06F 3/0658; G06F 3/0688;
(Continued)

(56) References Cited

U.S. PATENT DOCUMENTS 8,848,383 B2   9/2014   Herman et al.
9,082,632 B2 * 7/2015   Dayringer .......... H01L 25/0652
(Continued)

FOREIGN PATENT DOCUMENTS

CN   103019998 A   4/2013
TW   201344692 A  11/2013
(Continued)

OTHER PUBLICATIONS

"PCI Express Base Specification Revision 3.0", PCI-SIG, Section 4.2.4.10.1, Nov. 10, 2010, pp. 242-243.*
(Continued)

*Primary Examiner* — Tim T Vo
*Assistant Examiner* — Harry Z Wang
(74) *Attorney, Agent, or Firm* — Renaissance IP Law Group LLP

(57) ABSTRACT

Embodiments of the inventive concept include Open Cloud Server (OCS)-compliant and other enterprise servers having high-density modular non-volatile flash memory blades and associated multi-card modules. A modular non-volatile flash memory blade can be seated within a 1 U tray. The flash memory blade can include a server motherboard and multiple non-volatile flash memory blade multi-card modules. Each of the multi-card modules can include a printed circuit board, a switch coupled to the printed circuit board, a module power port, an input/output port, and riser card slots to receive solid state drive riser cards. The solid state drive riser cards can be seated within a corresponding riser card slot of the multi-card modules, and can each include multiple solid state drive chips. The server motherboard can communicate with the solid state drive chips via the cable connector riser cards and associated cables. The switch can expand each upstream port to multiple downstream ports associate with the solid state drive chips.

1 Claim, 12 Drawing Sheets

(51) Int. Cl.
*G06F 13/40* (2006.01)
*G06F 13/42* (2006.01)
*G06F 1/16* (2006.01)

(52) U.S. Cl.
CPC ...... *G06F 13/4022* (2013.01); *G06F 13/4068* (2013.01); *G06F 13/4282* (2013.01)

(58) Field of Classification Search
CPC ............... G06F 13/362; G06F 13/4022; G06F 13/4068; G06F 13/4282
See application file for complete search history.

(56) References Cited

U.S. PATENT DOCUMENTS

| | | | |
|---|---|---|---|
| 9,128,662 B2* | 9/2015 | Kim | G06F 1/1658 |
| 2008/0052437 A1* | 2/2008 | Loffink | G06F 1/189 |
| | | | 710/302 |
| 2011/0035540 A1* | 2/2011 | Fitzgerald | G06F 3/061 |
| | | | 711/103 |
| 2012/0185634 A1* | 7/2012 | Shirai | G06F 13/385 |
| | | | 710/316 |
| 2013/0107444 A1 | 5/2013 | Schnell et al. | |
| 2014/0233192 A1* | 8/2014 | Hsu | G06F 1/16 |
| | | | 361/737 |
| 2014/0268536 A1 | 9/2014 | Herman et al. | |
| 2014/0297923 A1 | 10/2014 | Dean et al. | |
| 2014/0298079 A1* | 10/2014 | Dean | G06F 12/0246 |
| | | | 714/4.5 |
| 2015/0261710 A1* | 9/2015 | Billi | G06F 13/4022 |
| | | | 710/316 |

FOREIGN PATENT DOCUMENTS

| | | |
|---|---|---|
| TW | 201409659 A | 3/2014 |
| WO | 2014039922 A2 | 3/2014 |

OTHER PUBLICATIONS

Tyco Electronics, "M.2 (NGFF) Connectors," TE Connectivity, http://te.com/products/ngff, Mar. 5, 2015, 8 pages.

* cited by examiner

MODULAR NON-VOLATILE FLASH MEMORY BLADE

RELATED APPLICATION DATA

This application claims the benefit of U.S. Patent Application Ser. No. 62/126,367, filed Feb. 27, 2015, which is hereby incorporated by reference.

BACKGROUND

The present inventive concepts relate to enterprise server solutions, and more particularly, to module non-volatile flash memory blades for use with enterprise and/or open cloud servers.

Enterprise servers provide computing and storage power for the Internet, the emerging Internet of Things, and myriad business intranets and applications. To some extent, enterprise servers make possible the conveniences of modern civilization. For example, trucking and transportation logistics rely heavily on enterprise computer servers. Internet searching, social networks, and social media also depend directly on a robust enterprise server infrastructure. These are but a few of the many industries that depend on such crucial computing resources. One particular architecture that has gained wide usage is referred to as the Open Cloud Server (OCS) architecture. The OCS architecture provides an open blade system targeted for cloud server applications.

But the OCS architecture and other similar architectures have limited capabilities for supporting non-volatile memory module arrays, which severely constrains compute blade system caching requirements. Traditional enterprise server implementations lack density and performance-centric storage capabilities, and have limited or no support for recent developments in the solid state drive sector. Embodiments of the present inventive concept address these and other limitations in the prior art.

BRIEF SUMMARY

Embodiments of the inventive concept include Open Cloud Server (OCS)-compliant and other enterprise servers having high-density, modular, high-performance, non-volatile flash memory blades and associated multi-card modules.

Embodiments of the inventive concept include a modular non-volatile flash memory blade. The modular non-volatile flash memory blade can include a server motherboard including one or more processors coupled to a plurality of upstream ports, a mid-plane board including one or more power ports, and a plurality of non-volatile flash memory blade multi-card modules. Each of the non-volatile flash memory blade multi-card modules can include a printed circuit board, a switch coupled to the printed circuit board, and a module power port coupled to the one or more power ports of the mid-plane board. The module power port can be coupled to the printed circuit board and electrically coupled to the switch.

Each of the non-volatile flash memory blade multi-card modules can further include an input/output port coupled to the printed circuit board, electrically coupled to the switch, and electrically coupled to a corresponding one of the upstream ports of the server motherboard. Each of the non-volatile flash memory blade multi-card modules can further include a plurality of riser card slots configured to receive one or more solid state drive riser cards. The one or more solid state drive riser cards can be configured to be electrically coupled to the switch and to the module power port.

The modular non-volatile flash memory blade can further include a plurality of cable connector riser cards configured to be seated in a corresponding one of the upstream ports of the server motherboard. The modular non-volatile flash memory blade can further include a plurality of cables configured to connect each of the upstream ports to a corresponding one of the input/output ports of a corresponding one of the non-volatile flash memory blade multi-card modules via a corresponding one of the cable connector riser cards.

Embodiments of the inventive concept can include a method for configuring and operating a modular non-volatile flash memory blade. The method can include connecting a plurality of cable connector riser cards to a plurality of upstream ports on a server motherboard. The method can include connecting a plurality of cables to the cable connector riser cards. The method can included connecting a plurality of non-volatile flash memory blade multi-card modules to the server motherboard via the plurality of cables, the plurality of cable connector riser cards, and the plurality of upstream ports on the server motherboard, respectively. The method can include seating one or more solid state drive riser cards in corresponding one or more slots of the non-volatile flash memory blade multi-card modules. The method can include transmitting, by the server motherboard, information to the plurality of non-volatile flash memory blade multi-card modules for storage on one or more solid state drive chips associated with the one or more solid state drive riser cards.

BRIEF DESCRIPTION OF THE DRAWINGS

The foregoing and additional features and advantages of the present inventive principles will become more readily apparent from the following detailed description, made with reference to the accompanying figures, in which.

DETAILED DESCRIPTION

Figure 1A:
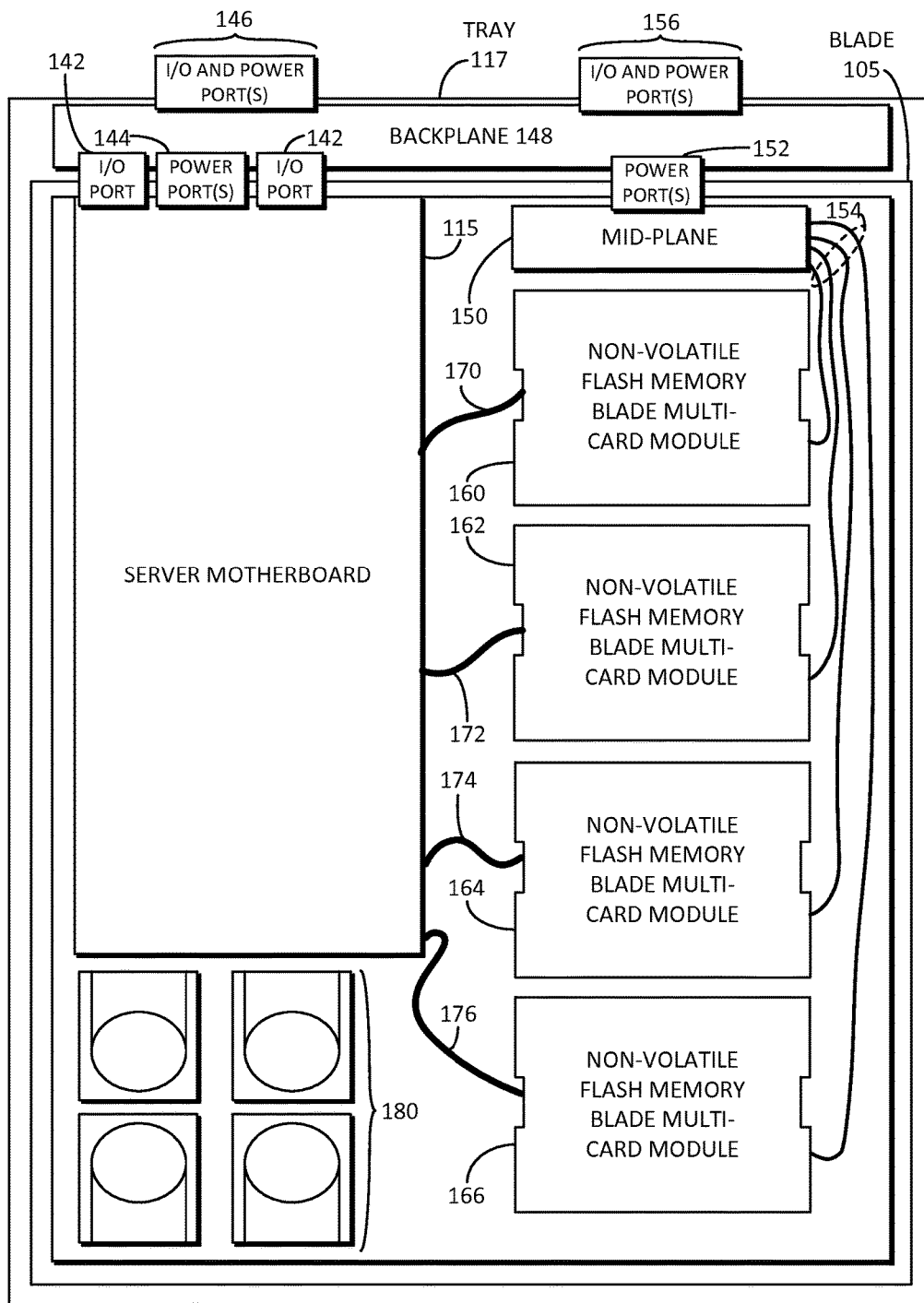
FIG. 1A is an example block diagram of a modular non-volatile flash memory blade within a 1 U tray in accordance with embodiments of the inventive concept.

Reference will now be made in detail to embodiments of the inventive concept, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first non-volatile memory multi-card module could be termed a second non-volatile memory multi-card module, and, similarly, a second non-volatile memory multi-card module could be termed a first non-volatile memory multi-card module, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Embodiments of the inventive concept include Open Cloud Server (OCS)-compliant and other enterprise servers having high-density modular non-volatile flash memory blades and associated multi-card modules. The non-volatile flash memory blades can incorporate M.2 form factor non-volatile memory express (NVMe) solid state drives (SSDs) in a high-density high-performance modular fashion, as further described in detail below. Embodiments of the inventive concept disclosed herein provide a flexible modular design where users can select how many multi-card modules to use based on capacity requirements, performance requirements, and/or the chassis form factor. In some embodiments, the modular non-volatile flash memory blades and/or multi-card modules can be incorporated directly into an enterprise server rather than as a separate blade device.

Cooling and thermal issues can be ameliorated by the upright multi-card modules, as also explained in detail below. Serviceability is also improved. The modular non-volatile flash memory blades and associated multi-card modules disclosed herein can be implemented with OCS architectures without requiring changes to the OCS architectures, thereby providing a straight-forward upgrade path.

Figure 1B:
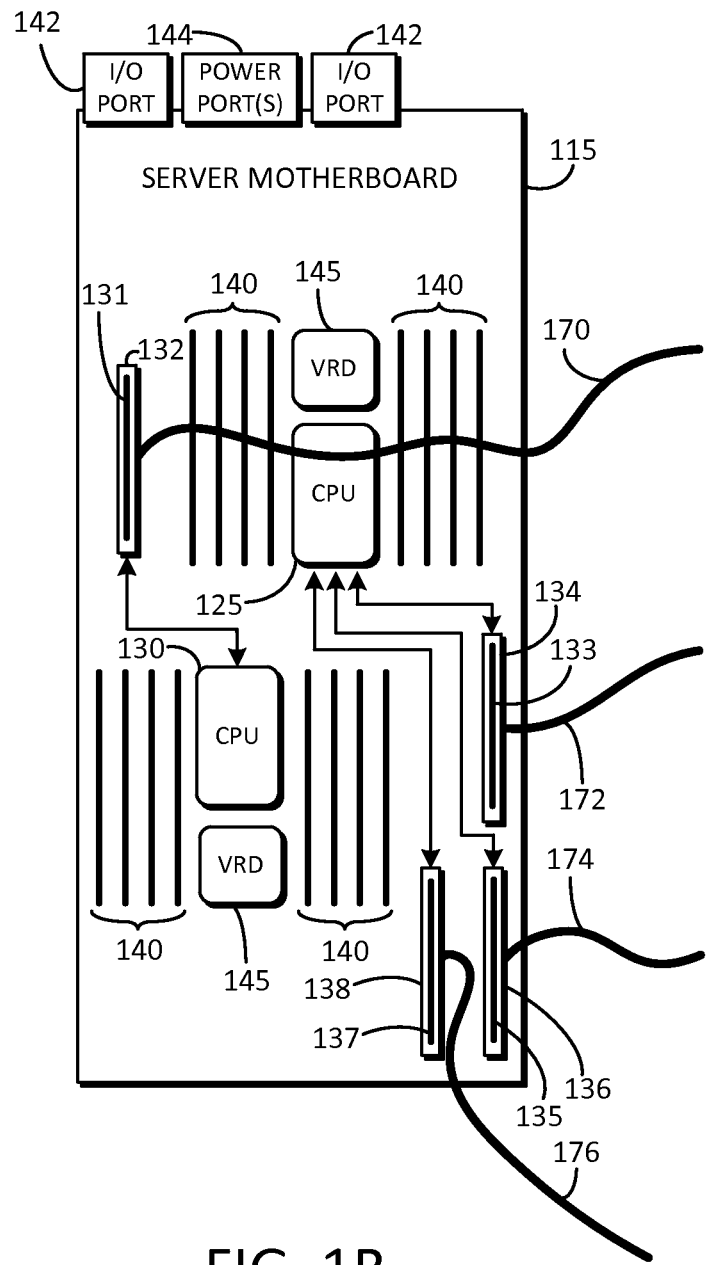
FIG. 1B is an example block diagram including details of a server motherboard of the modular non-volatile flash memory blade of FIG. 1A.
Figure 1C:
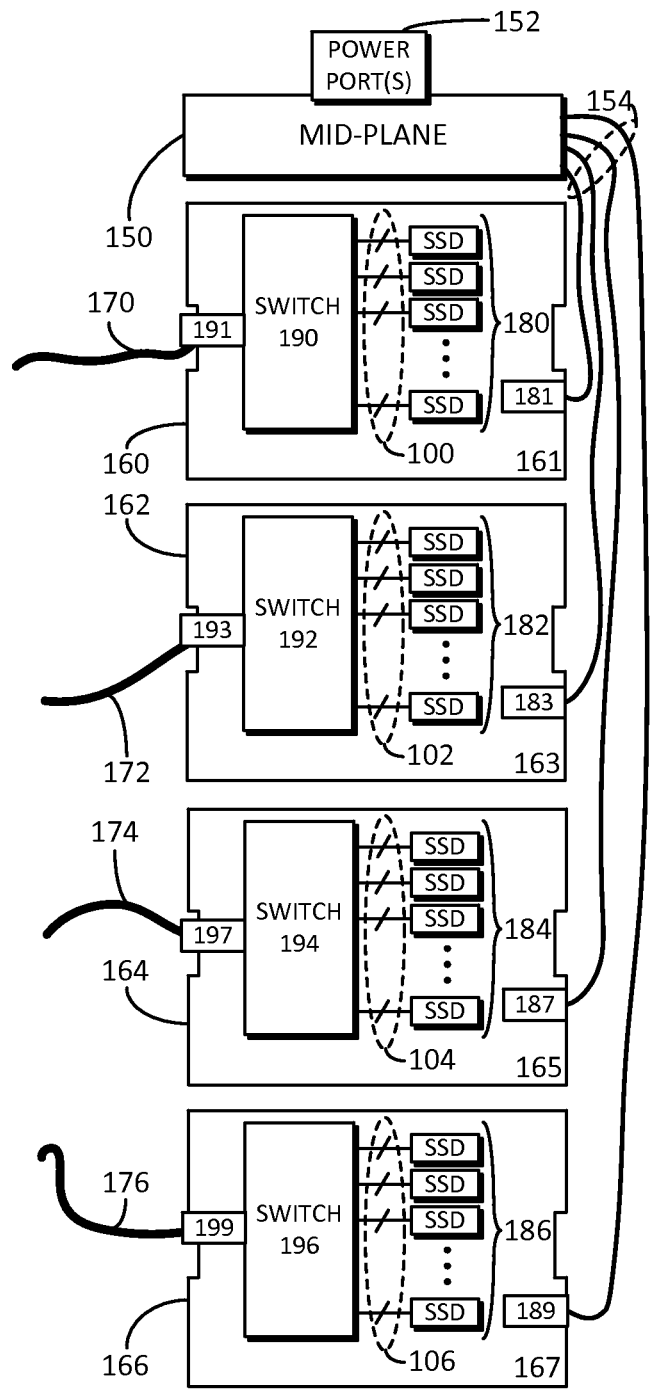
FIG. 1C is an example block diagram including details of non-volatile flash memory blade multi-card modules of the modular non-volatile flash memory blade of FIG. 1A.
Figure 1D:
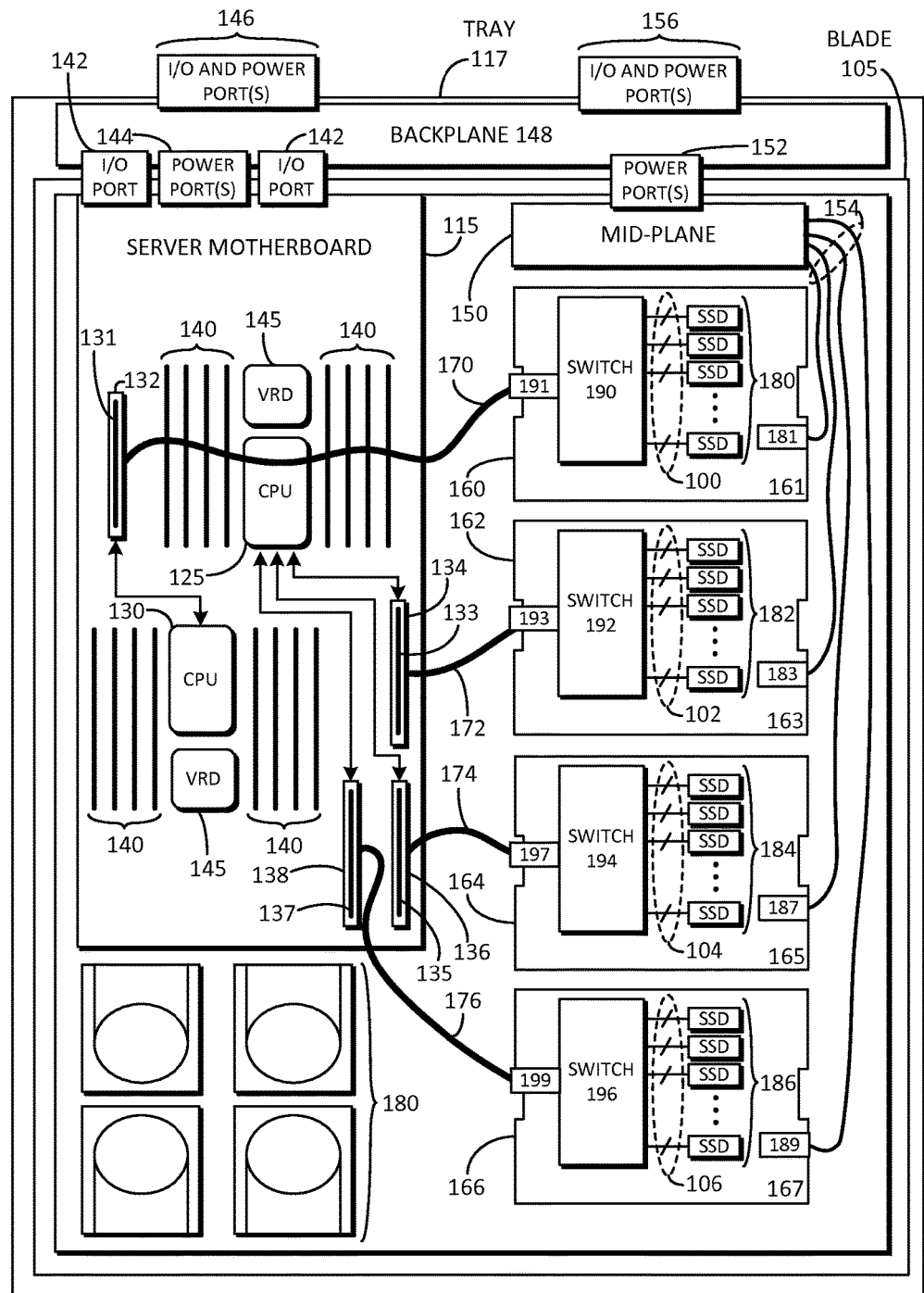
FIG. 1D is an example block diagram of the modular non-volatile flash memory blade within a 1 U tray of FIG. 1A, and also including details of the server motherboard and the modular non-volatile flash memory blade.

FIG. 1A is an example block diagram of a modular non-volatile flash memory blade 105 within a 1 U tray 117 in accordance with embodiments of the inventive concept. FIG. 1B is an example block diagram including details of a server motherboard of the modular non-volatile flash memory blade of FIG. 1A. FIG. 1C is an example block diagram including details of non-volatile flash memory blade multi-card modules of the modular non-volatile flash memory blade of FIG. 1A. FIG. 1D is an example block diagram of the modular non-volatile flash memory blade within a 1 U tray of FIG. 1A, and also including details of the server motherboard and the modular non-volatile flash memory blade. Reference is now made to FIGS. 1A through 1D.

The modular non-volatile flash memory blade 105 can include a server motherboard 115 including one or more processors (e.g., 125 and 130) coupled to multiple upstream ports (e.g., 132, 134, 136, and 138). It will be understood that the multiple upstream ports (e.g., 132, 134, 136, and 138) can be associated with particular physical slots on the motherboard 115, but the term "port" need not refer to a physical slot, but rather, the term "port" can refer herein to a logical port associated with a protocol. Each of the upstream ports (e.g., 132, 134, 136, and 138) can be a PCIe port. For example, each of the upstream ports (e.g., 132, 134, 136, and 138) can be a PCIe X8 port. It will be understood that any suitable kind of port and any suitable kind of connection can be used. The server motherboard 115 can be, for example, an OCS v2-compliant motherboard.

The processor 125 can be coupled to a first subset (e.g., 134, 136, and 138) of the upstream ports (e.g., 132, 134, 136, and 138). The processor 130 can be coupled to a second subset (e.g., 132) of the upstream ports (e.g., 132, 134, 136, and 138). It will be understood that the server motherboard 115 can include a single processor coupled to all of the upstream ports. It will also be understood that any suitable number of processors can be included on the server motherboard 115, and any suitable number of upstream ports can be included on or otherwise be associated with the server motherboard 115. The server motherboard 115 can include multiple voltage regulator-down (VRD) modules 145, volatile random access memory (RAM) modules 140, input/output ports 142, and/or power ports 144.

Each of the upstream ports (e.g., 132, 134, 136, and 138) can be associated with one or more of the processors (e.g., 125 and 130). The server motherboard 115 can be an OCS-compliant board. The upstream ports (e.g., 132, 134, 136, and 138) can be peripheral component interconnect express (PCIe) Gen3 X8 ports or slots. The upstream ports can connect to a compute host, which can be either coupled to the server motherboard 115 or external to the server motherboard 115. It will be understood that any suitable kind of port and any suitable kind of connection can be used.

The modular non-volatile flash memory blade 105 can include a mid-plane board 150, having one or more power ports 152. The mid-plane board 150 can be an NVMe compatible mid-plane board. The modular non-volatile flash memory blade 105 can include multiple non-volatile flash memory blade multi-card modules (e.g., 160, 162, 164, and 166). If a particular user application does not require such a high storage density, fewer than four multi-card modules can be used. For example, one, two, or three multi-card modules can be installed within the non-volatile flash memory blade 105. It will be understood that any suitable number of multi-card modules can be used. It will also be understood that the non-volatile flash memory blade multi-card modules (e.g., 160, 162, 164, and 166) can be associated with and/or coupled to their own blade that is physically separate from the blade 105, or otherwise combined with or part of the blade 105.

Each of the non-volatile flash memory blade multi-card modules (e.g., 160, 162, 164, and 166) can include a printed circuit board (e.g., 161, 163, 165, and 167). Each of the non-volatile flash memory blade multi-card modules (e.g., 160, 162, 164, and 166) can include a switch (e.g., 190, 192, 194, and 196) coupled to the printed circuit board (e.g., 161, 163, 165, and 167), respectively. Each of the switches (e.g., 190, 192, 194, and 196) can be a PCIe switch. It will be understood that any suitable kind of switch can be used.

In some embodiments, each of the non-volatile flash memory blade multi-card modules (e.g., 160, 162, 164, and 166) can include a module power port (e.g., 181, 183, 187, and 189), respectively, coupled to the one or more power ports 152 of the mid-plane board via power cables 154. The module power port (e.g., 181, 183, 187, and 189) can be coupled to the printed circuit board (e.g., 161, 163, 165, and 167), respectively, and electrically coupled to the switch (e.g., 190, 192, 194, and 196), respectively.

Each of the non-volatile flash memory blade multi-card modules (e.g., 160, 162, 164, and 166) can include an input/output port (e.g., 191, 193, 197, and 199), respectively, coupled to the printed circuit board (e.g., 161, 163, 165, and 167), respectively. Each of the input/output ports (e.g., 191, 193, 197, and 199) can be electrically coupled to a corresponding switch (e.g., 190, 192, 194, and 196), respectively, and electrically coupled to or otherwise associated with a corresponding one of the upstream ports (e.g., 132, 134, 136, and 138), respectively, of the server motherboard 115.

In addition, each of the non-volatile flash memory blade multi-card modules (e.g., 160, 162, 164, and 166) can include multiple riser card slots (further described below), which can receive one or more solid state drive riser cards (e.g., 180, 182, 184, and 186), respectively. The one or more solid state drive riser cards (e.g., 180, 182, 184, and 186) can be electrically coupled to the switch (e.g., 190, 192, 194, and 196), respectively, via conductive lines (e.g., 100, 102, 104, and 106), respectively. Each of the conductive lines 100 can represent multiple conductive lines, wires, busses, channels, or the like. The one or more solid state drive riser cards (e.g., 180, 182, 184, and 186) can be electrically coupled to a corresponding module power port (e.g., 181, 183, 187, and 189), respectively.

The modular non-volatile flash memory blade 105 can include multiple cable connector riser cards (e.g., 131, 133, 135, and 137), which can be seated in a corresponding one of the upstream ports (e.g., 132, 134, 136, and 138), respectively, of the server motherboard 115. One or more of the cables (e.g., 170, 172, 174, and 176) can connect each of the upstream ports (e.g., 132, 134, 136, and 138) to a corresponding one of the input/output ports (e.g., 191, 193, 197, and 199), respectively, of a corresponding one of the non-volatile flash memory blade multi-card modules (e.g., 160, 162, 164, and 166), respectively, via a corresponding one of the cable connector riser cards (e.g., 131, 133, 135, and 137), respectively. It will be understood that while the term "cable" is used herein, such connections can be made using wires, wireless links, and/or any suitable line or conductor.

Each of the non-volatile flash memory blade multi-card modules (e.g., 160, 162, 164, and 166) can communicate with the one or more processors (e.g., 125, 130). For example, each of the non-volatile flash memory blade multi-card modules (e.g., 160, 162, 164, and 166) can communicate with the one or more processors via a corresponding one of the cables (e.g., 170, 172, 174, and 176), respectively, and a corresponding one of the cable connector riser cards (e.g., 131, 133, 135, and 137), respectively. It will be understood that the modular non-volatile flash memory blade 105 can include any suitable number of non-volatile flash memory blade multi-card modules, any suitable number of cables, and any suitable number of cable connector riser cards.

The non-volatile flash memory blade multi-card module 160 can communicate with the processor 125 and/or the processor 130 via the cable 170, the cable connector riser card 131, and the upstream port 132. The non-volatile flash memory blade multi-card module 162 can communicate with the processor 125 and/or the processor 130 via the cable 172, the cable connector riser card 133, and the upstream port 134. The non-volatile flash memory blade multi-card module 164 can communicate with the processor 125 and/or the processor 130 via the cable 174, the cable connector riser card 135, and the upstream port 136. The non-volatile flash memory blade multi-card module 166 can communicate with the processor 125 and/or the processor 130 via the cable 176, the cable connector riser card 137, and the upstream port 138.

The modular non-volatile flash memory blade 105 can include one or more magnetic hard disk drives 180, which can communicate with the one or more processors (e.g., 125, 130), and/or store data having a relatively long-term storage horizon for the server motherboard 115. The modular non-volatile flash memory blade 105 can be seated in a tray 117. The tray 117 can be, for example, an OCS v2-compliant tray. The tray 117 can be a 1 U tray. The tray 117 can include a backplane 148.

The tray 117 can include input/output and power ports 146, which can provide an interface and/or power to the server motherboard 115, hard disk drives 180, or the like. In addition, the tray 117 can include input/output and power ports 156, which can provide an interface and/or power to the mid-plan 150 and/or the non-volatile flash memory blade multi-card modules (e.g., 160, 162, 164, and 166). The input/output and power ports (e.g., 146 and 156) can include one or more serial attached SCSI (SAS) ports or connectors, such as an iPASS™ SAS port. The modular non-volatile flash memory blade 105 can be seated within the tray 117 and coupled to the backplane 147 of the tray 117.

Figure 2A:
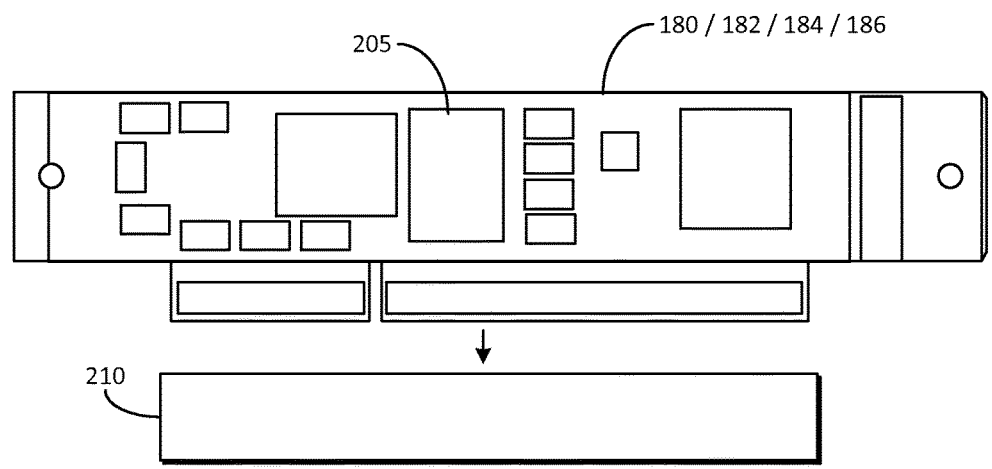
FIG. 2A is an example front view of a solid state drive riser card in accordance with embodiments of the inventive concept.
Figure 2B:
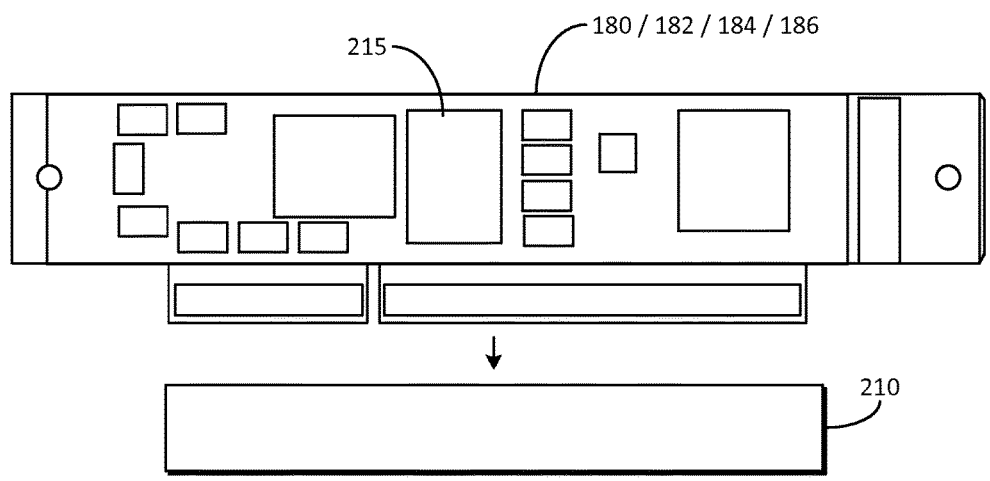
FIG. 2B is an example back view of the solid state drive riser card of FIG. 2A in accordance with embodiments of the inventive concept.

FIG. 2A is an example front view of a solid state drive riser card (e.g., 180, 182, 184, and 186) in accordance with embodiments of the inventive concept. FIG. 2B is an example back view of the solid state drive riser card of FIG. 2A in accordance with embodiments of the inventive concept. Reference is now made to FIGS. 2A and 2B.

Each of the one or more solid state drive riser cards (e.g., 180, 182, 184, and 186) can be seated in an up-right orientation within a corresponding riser card slot (e.g., 210), or extracted therefrom. Cooling and thermal issues can be ameliorated by the orientation of the upright multi-card modules while simultaneously providing enhanced density. By arranging the solid state drive riser cards in vertical 3D circulation space, an increased density can be achieved while simplifying and improving thermal cooling by allowing an increased airflow contact across the available 3D space, even when confined within a 1 U tray or enclosure.

Each of the one or more solid state drive riser cards (e.g., 180, 182, 184, and 186) can communicate with the one or more processors (e.g., 125 and 130 of FIG. 1B) of the server motherboard (e.g., 115 of FIG. 1A) via the switch (e.g., 190, 192, 194, and 196 of FIG. 1C), respectively, and the input/output port (e.g., 191, 193, 197, and 199 of FIG. 1C) of a corresponding non-volatile flash memory blade multi-card module (e.g., 160, 162, 164, and 166 of FIG. 1A), respectively.

Each of the one or more solid state drive riser cards (e.g., 180, 182, 184, and 186) can include one or more solid state drive chips (e.g., 205 and 215) configured to communicate with the one or more processors (e.g., 125 and 130 of FIG. 1B) of the server motherboard (e.g., 115 of FIG. 1A) via the switch (e.g., 190, 192, 194, and 196 of FIG. 1C), respectively, and the input/output port (e.g., 191, 193, 197, and 199 of FIG. 1C) of a corresponding non-volatile flash memory blade multi-card module (e.g., 160, 162, 164, and 166 of FIG. 1A), respectively. The one or more solid state drive riser cards and chips can be M.2 compliant.

More specifically, each of the one or more solid state drive riser cards (e.g., 180, 182, 184, and 186) can include a first solid state drive chip 205 on one side thereof to communicate with the one or more processors (e.g., 125 and 130) of the server motherboard (e.g., 115) via the switch (e.g., 190, 192, 194, and 196), respectively, and the input/output port (e.g., 191, 193, 197, and 199) of a corresponding non-volatile flash memory blade multi-card module (e.g., 160, 162, 164, and 166), respectively.

In some embodiments, each of the one or more solid state drive riser cards (e.g., 180, 182, 184, and 186) can include a second solid state drive chip 215 on another side thereof to communicate with the one or more processors (e.g., 125 and 130) of the server motherboard (e.g., 115) via the switch (e.g., 190, 192, 194, and 196), respectively, and the input/output port (e.g., 191, 193, 197, and 199) of a corresponding non-volatile flash memory blade multi-card module (e.g., 160, 162, 164, and 166), respectively.

The one or more solid state drive riser cards (e.g., 180, 182, 184, and 186) and associated solid state drive chips can accommodate various M.2 form factors, including 22×42 mm, 22×60 mm, 22×80 mm, and 22×110 mm, or the like.

Figure 3:
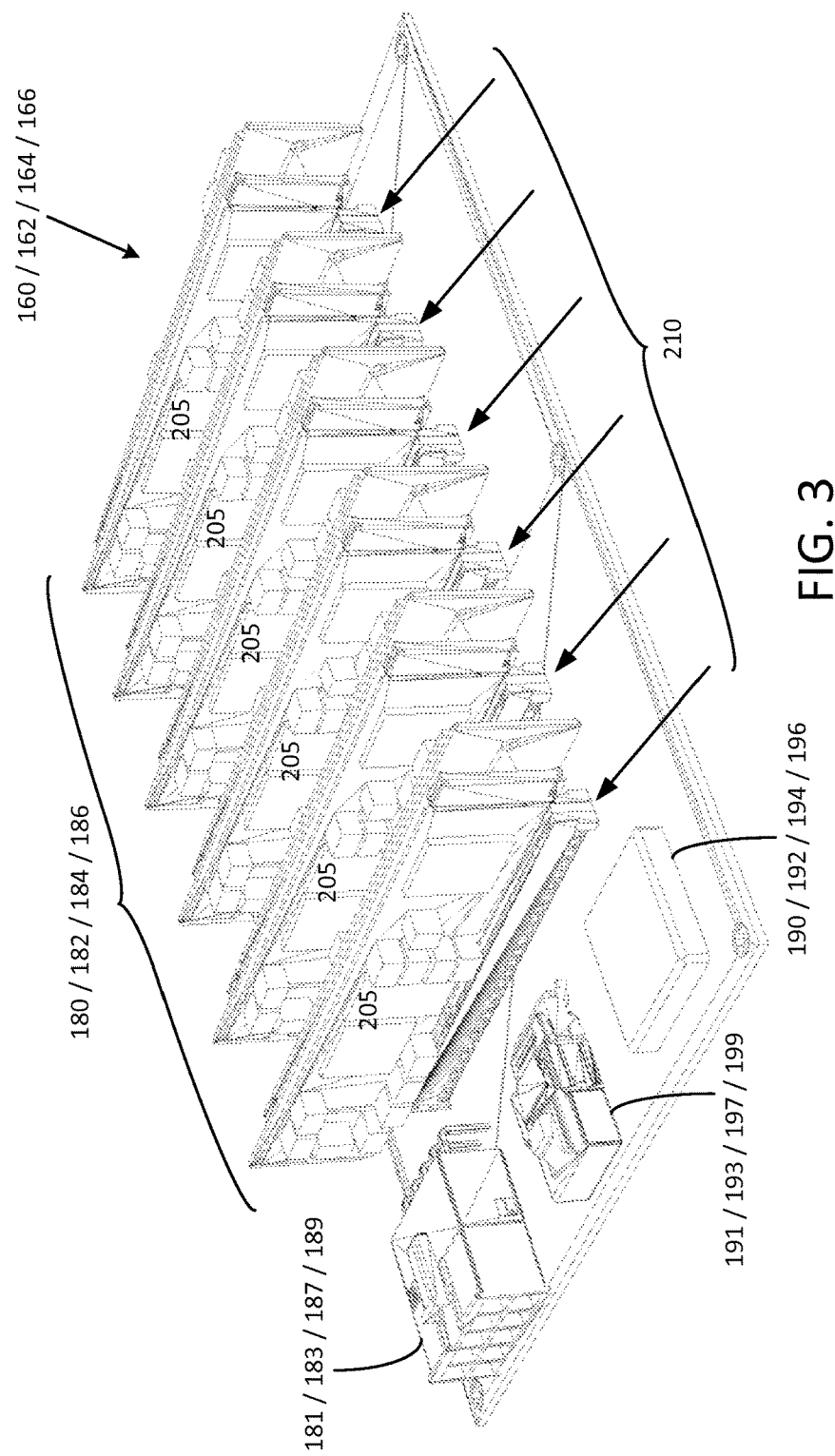
FIG. 3 is an example perspective view of a non-volatile flash memory blade multi-card module including multiple solid state drive riser cards in accordance with embodiments of the inventive concept.
Figure 4:
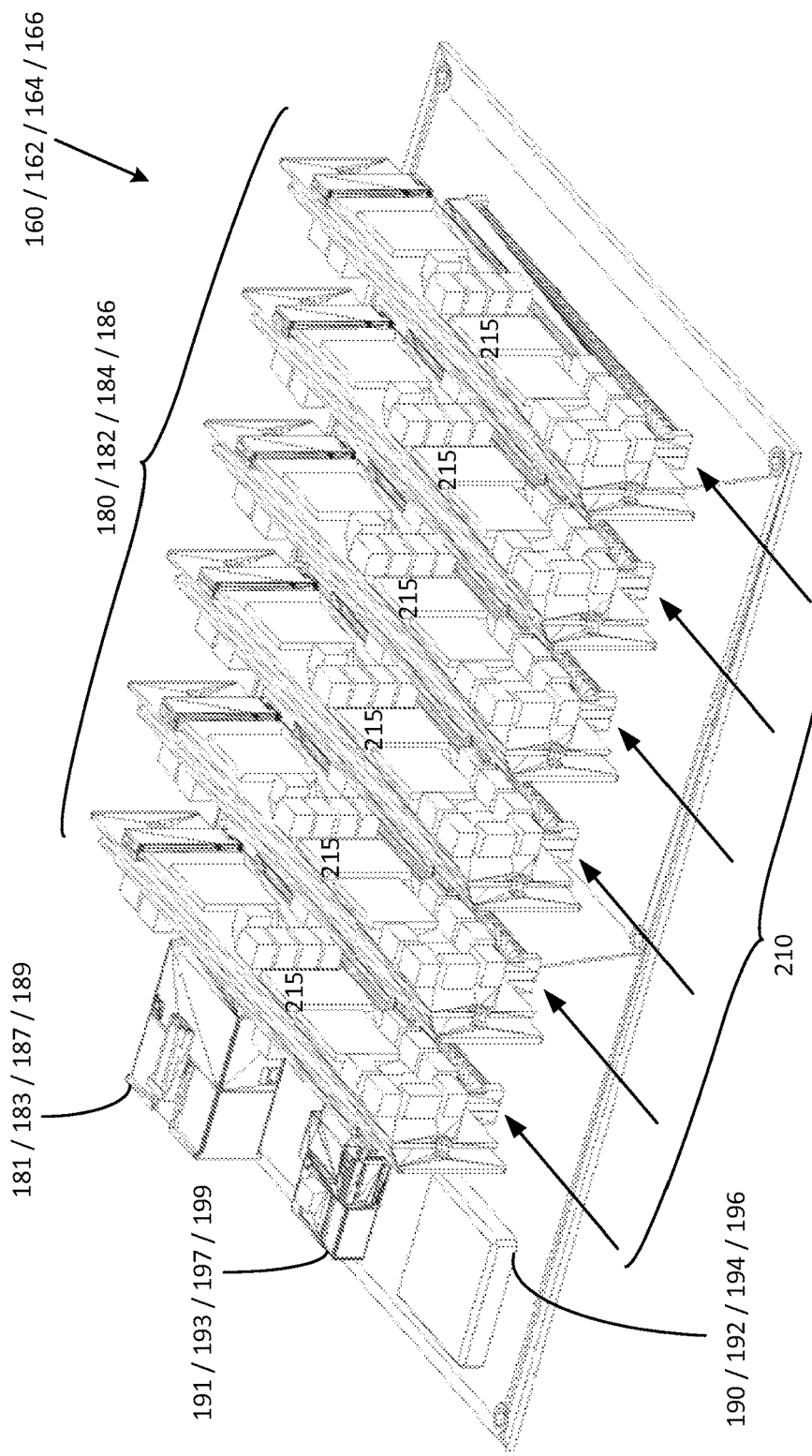
FIG. 4 is another example perspective view of the non-volatile flash memory blade multi-card module of FIG. 3 including multiple solid state drive riser cards in accordance with embodiments of the inventive concept.

FIG. 3 is an example perspective view of a non-volatile flash memory blade multi-card module (e.g., 160, 162, 164, 166) including multiple solid state drive riser cards (e.g., 180, 182, 184, and 186) in accordance with embodiments of the inventive concept. FIG. 4 is another example perspective view of the non-volatile flash memory blade multi-card module (e.g., 160, 162, 164, and 166) of FIG. 3 including multiple solid state drive riser cards (e.g., 180, 182, 184, and 186) in accordance with embodiments of the inventive concept. Reference is now made to FIGS. 3 and 4.

The non-volatile flash memory blade multi-card module can include the module power port (e.g., 181, 183, 187, 189), the input/output port (e.g., 191, 193, 197, and 199), and/or the switch (e.g., 190, 192, 194, and 196). The input/output ports can each include a port or connector, such as, for example, an iPASS™ SAS port or connector. The module power ports can each include a power connector, such as, for example, a PCIe power connector. It will be understood that any suitable kind of PCIe power connector can be used. Each of the solid state drive riser cards (e.g., 180, 182, 184, and 186) can be seated in a corresponding one of the riser card slots 210.

The riser card slots 210 can receive the solid state drive riser cards (e.g., 180, 182, 184, and 186). The solid state drive riser cards (e.g., 180, 182, 184, and 186) can be electrically coupled to the switch (e.g., 190, 192, 194, and 196), respectively, to the power port (e.g., 181, 181, 187, and 189), respectively, and to the input/output port (e.g., 191, 193, 197, and 199), respectively.

The input/output port (e.g., 191, 193, 197, and 199) can each include or otherwise be associated with an upstream port (e.g., 132, 134, 136, and 138). The switch (e.g., 190, 192, 194, and 196) can expand each of the upstream ports (e.g., 132, 134, 136, and 138) into multiple downstream ports. In other words, the link from the upstream port 132 to the input/output port 191 can be expanded downstream of the input/output port 191 so that each of the riser card slots 210 (of FIGS. 2A and 2B) and occupying solid state riser cards 180 share the upstream port 132. A similar connective and expansive arrangement can apply to the other upstream ports (e.g., 134, 136, and 138), the other input/output ports (e.g., 193, 197, and 199), the other switches (e.g., 192, 194, and 196), and the other solid state riser cards (e.g., 182, 184, and 186), respectively. It will be understood that the term "downstream port" need not refer to a physical port, but can refer to a logical port that is associated with a protocol. Each of the downstream ports can be associated with a corresponding one of the first solid state drive chip 205 and/or the second solid state drive chip 215 (of FIGS. 2B, and 4).

Put slightly differently, the input/output port (e.g., 191, 193, 197, and 199) of each of the non-volatile flash memory blade multi-card modules (e.g., 160, 162, 164, and 166), respectively, can include or otherwise be associated with an upstream port (e.g., 191/132, 193/134, 197/136, and 199/138). The switch (e.g., 190, 192, 194, and 196) of each of the non-volatile flash memory blade multi-card modules (e.g., 160, 162, 164, and 166) can expand a corresponding upstream port (e.g., 191/132, 193/134, 197/136, and 199/138) into multiple downstream ports.

Each of the downstream ports of each non-volatile flash memory blade multi-card module (e.g., 160, 162, 164, and 166) can be associated with a corresponding one of the first solid state drive chip 205 or the second solid state drive chip 215. The upstream port (e.g., 191/132, 193/134, 197/136, and 199/138) of each non-volatile flash memory blade multi-card module (e.g., 160, 162, 164, and 166), respectively, can include, for example a peripheral component interconnect express (PCIe) port, such as, for example, a PCIe X8 upstream port. It will be understood that any suitable kind of port can be used.

The switch (e.g., 190, 192, 194, and 196) of each non-volatile flash memory blade multi-card module (e.g., 160, 162, 164, and 166) can include a PCIe switch, which can expand one of the PCIe X8 upstream ports into twelve or more PCIe X4 downstream ports. It will be understood that any suitable kind of switch and ports can be used. The riser card slots 210 of each non-volatile flash memory blade multi-card module (e.g., 160, 162, 164, and 166) can include six or more riser card slots. Since each non-volatile flash memory blade multi-card module (e.g., 160, 162, 164, and 166) can include two solid state drive chips (e.g., 205 and 215), for a total of twelve solid state drive chips per non-volatile flash memory blade multi-card module, the twelve PCIe X4 downstream ports can each be associated with a corresponding one of the solid state drive chips. The compute portion or node of the blade 105 (i.e., motherboard 115) can have four upstream ports (e.g., 132, 134, 136, and 138) each of which can provide 8 PCIe lanes for a total of 32 PCIe lanes between the compute portion and the non-volatile flash memory blade multi-card modules (e.g., 160, 162, 164, and 166). The switches (e.g., 190, 192, 194, and 196) can collectively expand the 32 PCIe lanes into 48 PCIe X4 downstream ports.

In other words, the solid state drive riser cards (e.g., 180, 182, 184, and 186) of each non-volatile flash memory blade multi-card module (e.g., 160, 162, 164, and 166) can include six or more solid state drive riser cards seated within a corresponding riser card slot from among the six or more riser card slots 210. The first solid state drive chip (e.g., 205) of each of the six or more solid state drive riser cards of each non-volatile flash memory blade multi-card module can be coupled to a corresponding PCIe X4 downstream port from among the twelve or more PCIe X4 downstream ports. Similarly, the second solid state drive chip (e.g., 215) of each of the six or more solid state drive riser cards of each non-volatile flash memory blade multi-card module can be coupled to a corresponding PCIe X4 downstream port from among the twelve or more PCIe X4 downstream ports.

Figure 5A:
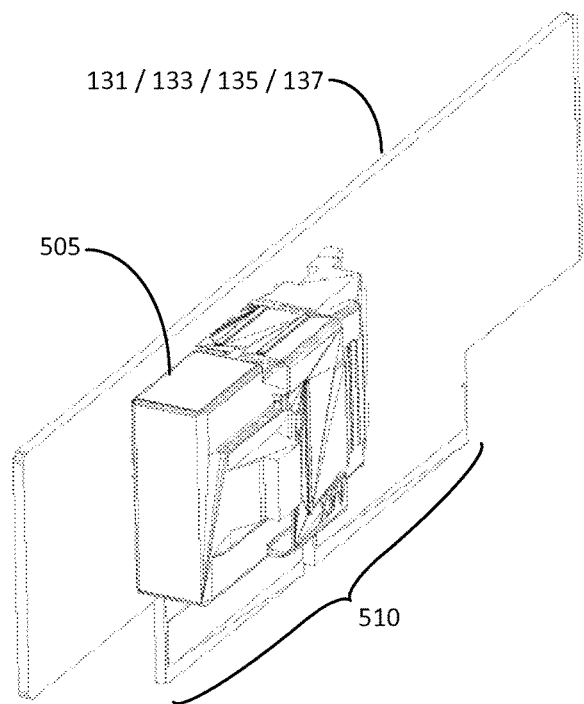
FIG. 5A is an example perspective view of a cable connector riser card in accordance with embodiments of the inventive concept.
Figure 5B:
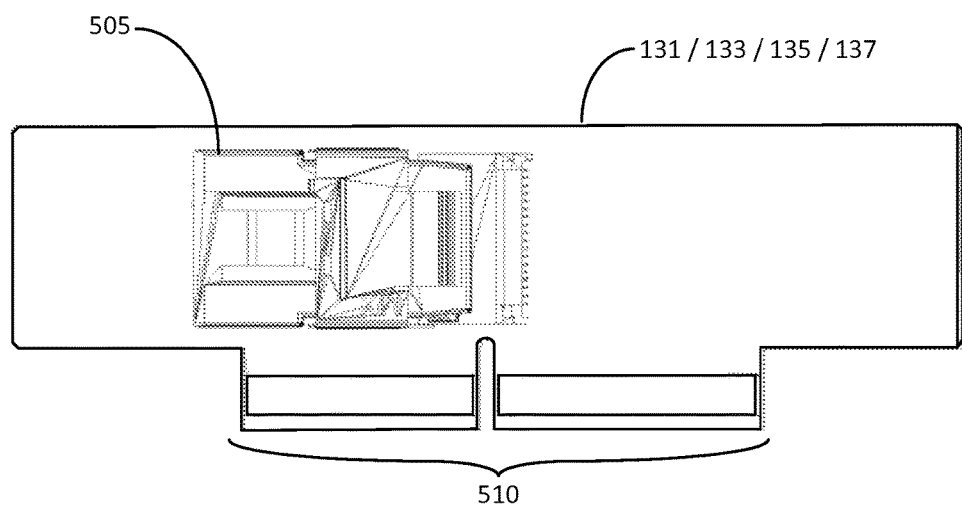
FIG. 5B is an example front view of the cable connector riser card of FIG. 5A in accordance with embodiments of the inventive concept.

FIG. 5A is an example perspective view of a cable connector riser card (e.g., 131, 133, 135, and 137 of FIG. 1B) in accordance with embodiments of the inventive concept. FIG. 5B is an example front view of the cable connector riser card (e.g., 131, 133, 135, and 137) of FIG. 5A in accordance with embodiments of the inventive concept. Reference is now made to FIGS. 5A and 5B.

Each of the cable connector riser cards (e.g., 131, 133, 135, and 137) can be seated in a corresponding slot associated with one of the upstream ports (e.g., 132, 134, 136, and 138) of the server motherboard (e.g., 115). For example, a slot connector portion 510 of each of the cable connector riser cards (e.g., 131, 133, 135, and 137) can be inserted into a corresponding slot associated with an upstream port (e.g., 132, 134, 136, and 138), or extracted therefrom. Each of the cable connector riser cards (e.g., 131, 133, 135, and 137) can include a cable connector portion 505. The cable connector portion 505 of each of the input/output ports can include, for example, an iPASS™ SAS port or connector. The cable connector portion 505 can receive a corresponding cable (e.g., 170, 172, 174, and 176).

Figure 6:
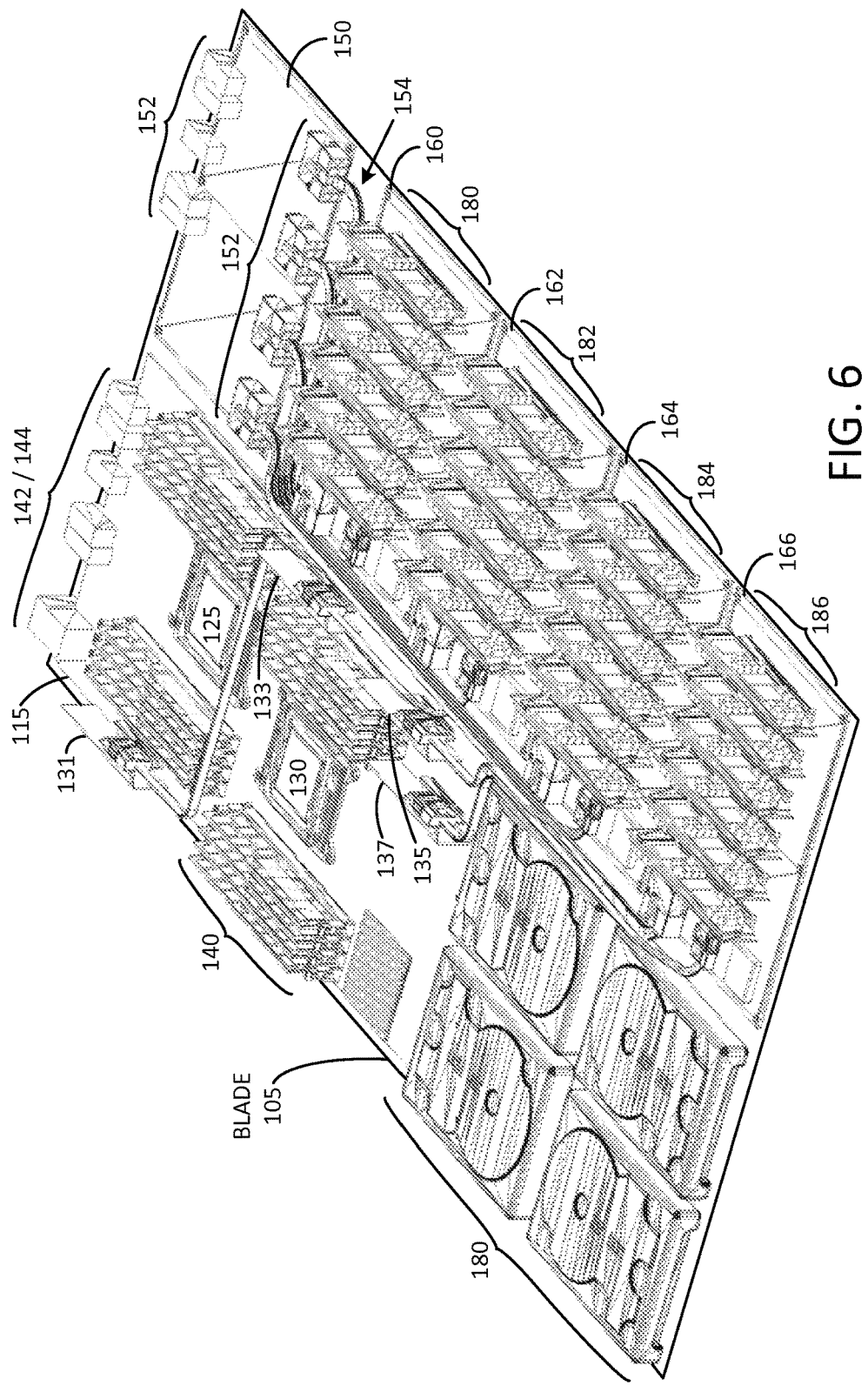
FIG. 6 is an example perspective view of a modular non-volatile flash memory blade including a server motherboard and multiple non-volatile flash memory blade multi-card modules in accordance with embodiments of the inventive concept.

FIG. 6 is an example perspective view of a modular non-volatile flash memory blade 105 including a server motherboard 115 and multiple non-volatile flash memory blade multi-card modules (e.g., 160, 162, 164, and 166) in accordance with embodiments of the inventive concept. Several components of the modular non-volatile flash memory blade 105 are discussed in detail above, and therefore, a complete detailed description of such components is not repeated.

In general, however, the server motherboard 115 of the modular non-volatile flash memory blade 105 can include the processors 125 and 130, the RAM modules 140, the cable connector riser cards (e.g., 131, 133, 135, and 137), the input/output and power ports 142/144, the hard disk drives 180, or the like. Each of the non-volatile flash memory blade multi-card modules (e.g., 160, 162, 164, and 166) of the modular non-volatile flash memory blade 105 can include corresponding solid state drive riser cards (e.g., 180, 182, 184, and 186), respectively. Each of the non-volatile flash memory blade multi-card modules (e.g., 160, 162, 164, and 166) can be electrically coupled to the mid-plane board 150 via the power cables 154. The mid-plane board 150 can include the one or more power ports 152.

Figure 7:
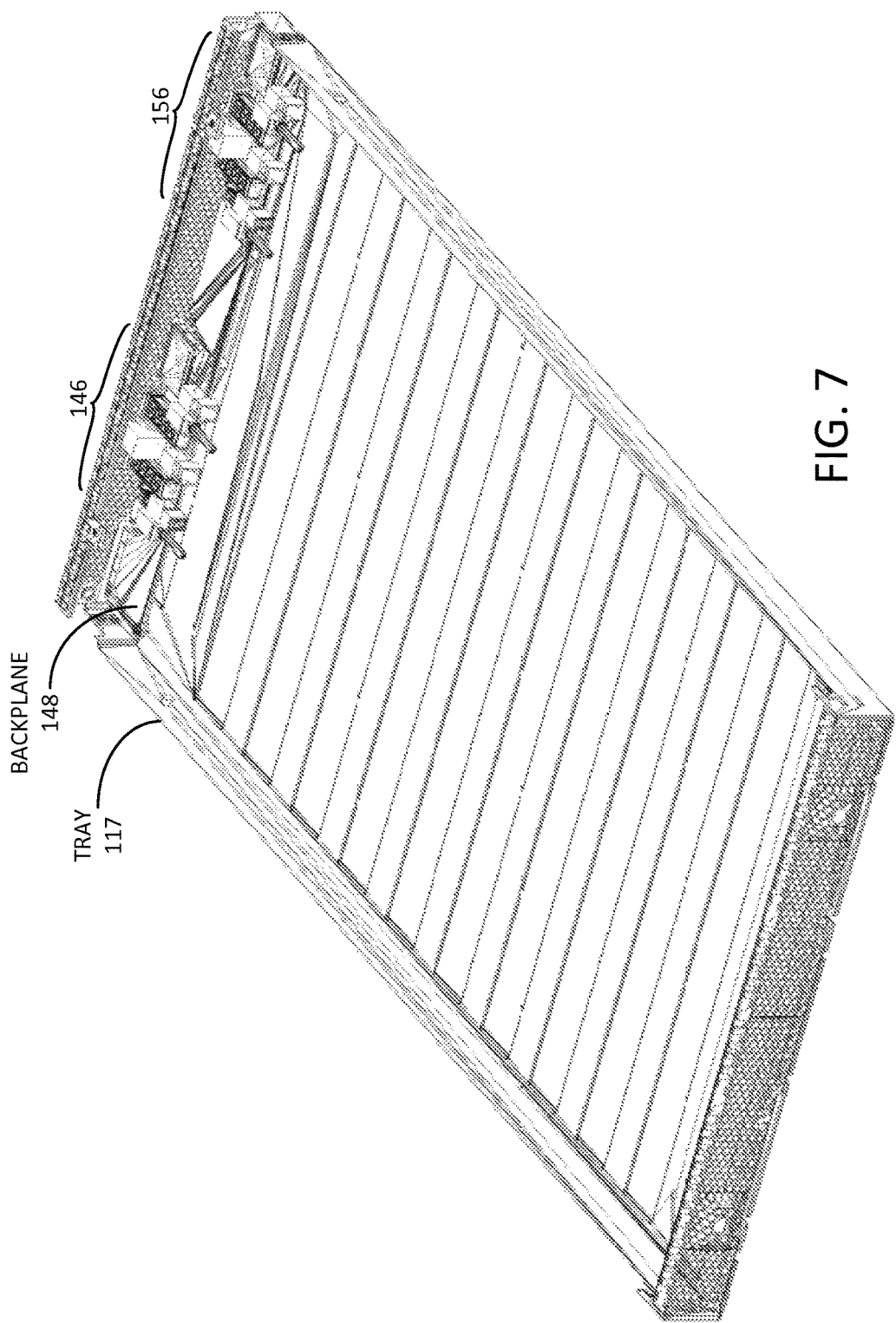
FIG. 7 is an example perspective view of a 1 U tray within which the modular non-volatile flash memory blade of FIG. 6 can be seated in accordance with embodiments of the inventive concept.

FIG. 7 is an example perspective view of a 1 U half-width tray 117 within which the modular non-volatile flash memory blade 105 of FIGS. 1 and 6 can be seated in accordance with embodiments of the inventive concept. The tray 117 can include the backplane 148 and the associated input/output and power ports 146 and input/output and power ports 156. Using a 1 U half-width form factor, the tray 117 and the associated blade 105 can collectively accommodate 48 solid state drive chips (based on the example embodiments presented above). The solid state drive chips can be arranged and managed as a "JBOD," otherwise known as "just a bunch of disks" configuration. Alternatively, the solid state drive chips can be arranged and managed as a redundant array of independent disks (RAID) configuration.

In an example embodiment where each solid state drive chip has 1 gigabyte (GB) of storage capacity, the 1 U half-width tray 117 and the associated blade 105 can provide 48 GB of NVMe storage capacity. In another example embodiment where each solid state drive chip has 2 gigabyte (GB) of storage capacity, the 1 U half-width tray 117 and the associated blade 105 can provide 96 GB of NVMe storage capacity. It will be understood that the capacity of each solid state drive chip can be any suitable number of GB according to the continual advancement of solid state drive storage capacity. Where two half-width trays 117 are combined, the storage capacity can be doubled again within a full-width 1 U form factor. Any suitable number of half-width trays can be combined to form large storage installations.

Figure 8:
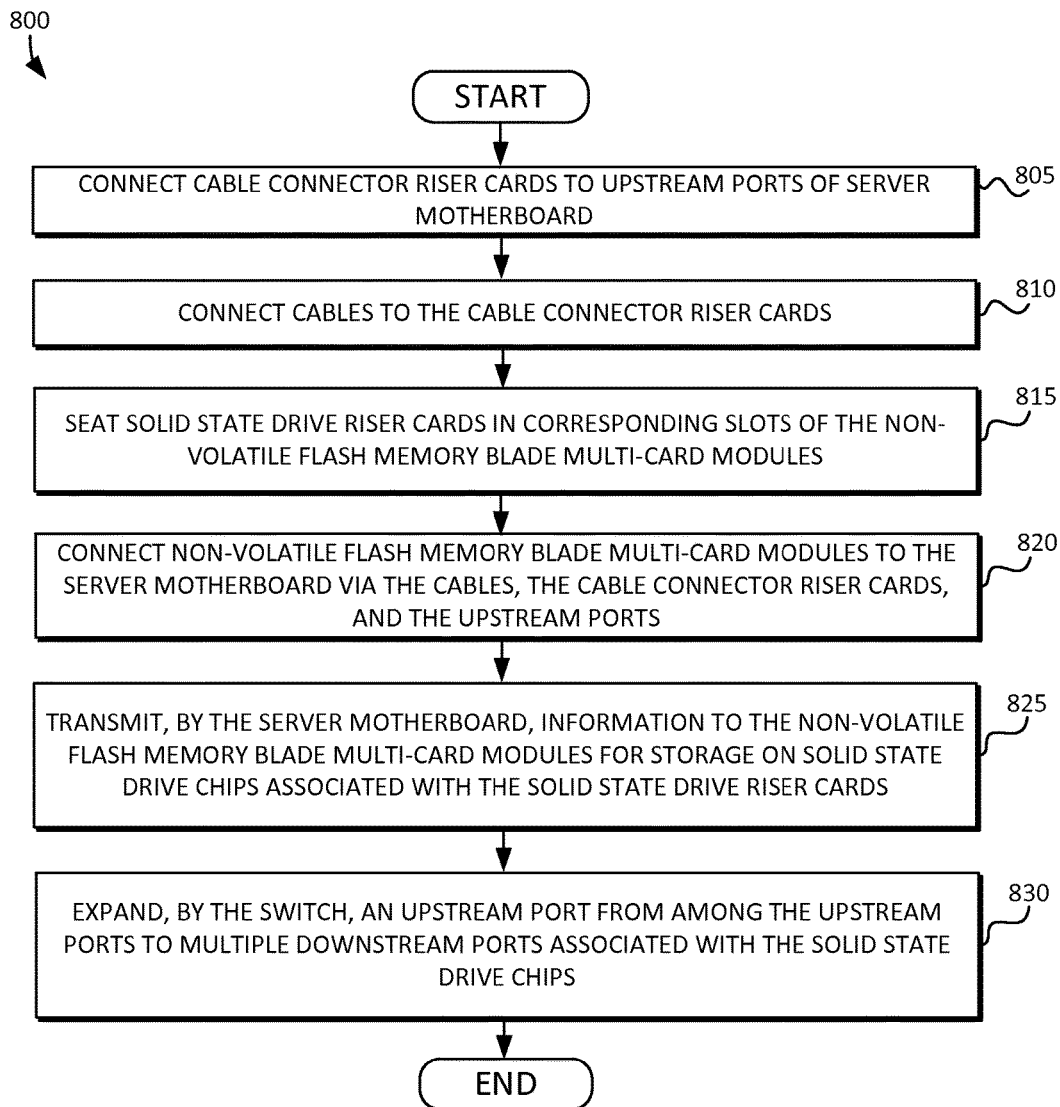
FIG. 8 illustrates a flow diagram including a technique for configuring and operating a modular non-volatile flash memory blade in accordance with embodiments of the inventive concept.

FIG. 8 illustrates a flow diagram 800 including a technique for configuring and operating a modular non-volatile flash memory blade in accordance with embodiments of the inventive concept.

The technique can begin at 805, where cable connector riser cards can be connected to upstream ports of a server motherboard. At 810, cables can be connected to the cable connector riser cards. At 815, solid state drive riser cards can be seated in corresponding slots of the non-volatile flash memory blade multi-card modules. At 820, non-volatile flash memory blade multi-card modules can be connected to the server motherboard via the cables, the cable connector riser cards, and the upstream ports. At 825, information can be transmitted, by the server motherboard, to the non-volatile flash memory blade multi-card modules for storage on solid state drive chips associated with the solid state drive riser cards. At 830, an upstream port can be expanded, by the switch, to multiple downstream ports associated with the solid state drive chips.

More specifically, a plurality of cable connector riser cards (e.g., 131, 133, 135, and 137 of FIG. 1B) can be connected to a plurality of upstream ports (e.g., 132, 134, 136, and 138 of FIG. 1B) on a server motherboard (e.g., 115 of FIG. 1A). A plurality of cables (e.g., 170, 172, 174, and 176 of FIG. 1A) can be connected to the cable connector riser cards (e.g., 131, 133, 135, and 137 of FIG. 1B). A plurality of non-volatile flash memory blade multi-card modules (e.g., 160, 162, 164, and 166 of FIG. 1A) can be connected to the server motherboard (e.g., 115) via the plurality of cables (e.g., 170, 172, 174, and 176), the plurality of cable connector riser cards (e.g., 131, 133, 135, and 137), and the plurality of upstream ports (e.g., 132, 134, 136, and 138) on the server motherboard (e.g., 115), respectively.

One or more solid state drive riser cards (e.g., 180, 182, 184, and 186 of FIG. 1C) can be seated in corresponding one or more slots (e.g., 210 of FIGS. 2A and 2B) of the non-volatile flash memory blade multi-card modules (e.g., 160, 162, 164, and 166). Information can be transmitted, by the server motherboard (e.g., 115), to the plurality of non-volatile flash memory blade multi-card modules (e.g., 160, 162, 164, and 166) for storage on one or more solid state drive chips (e.g., 205 and 215 of FIGS. 2A and 2B) associated with the one or more solid state drive riser cards (e.g., 180, 182, 184, and 186).

A switch (e.g., 190, 192, 194, and 196 of FIG. 1C) that is associated with a non-volatile flash memory blade multi-card module (e.g., 160, 162, 164, and 166 of FIG. 1A) can expand an upstream port (e.g., 132, 134, 136, and 138 of FIG. 1B), to a plurality of downstream ports associated with the one or more solid state drive chips (e.g., 205 and 215).

Each of the upstream ports can include a peripheral component interconnect express (PCIe) port, such as, for example, a X8 upstream port. The switch can include a PCIe switch. The downstream ports can include twelve or more PCIe ports, such as, for example, twelve or more PCIe X4 downstream ports for each non-volatile flash memory blade multi-card module (e.g., 160, 162, 164, and 166). In some embodiments, for example, the PCIe switch of each non-volatile flash memory blade multi-card module can expand a PCIe X8 upstream port from among the plurality of PCIe X8 upstream ports, to the twelve or more PCIe X4 downstream ports for each of the non-volatile flash memory blade multi-card modules (e.g., 160, 162, 164, and 166). It will be understood that any suitable kind of port and any suitable kind of connection can be used.

It will be understood that the steps need not occur in the illustrated order, but rather, can occur in a different order and/or with intervening steps.

Figure 9:
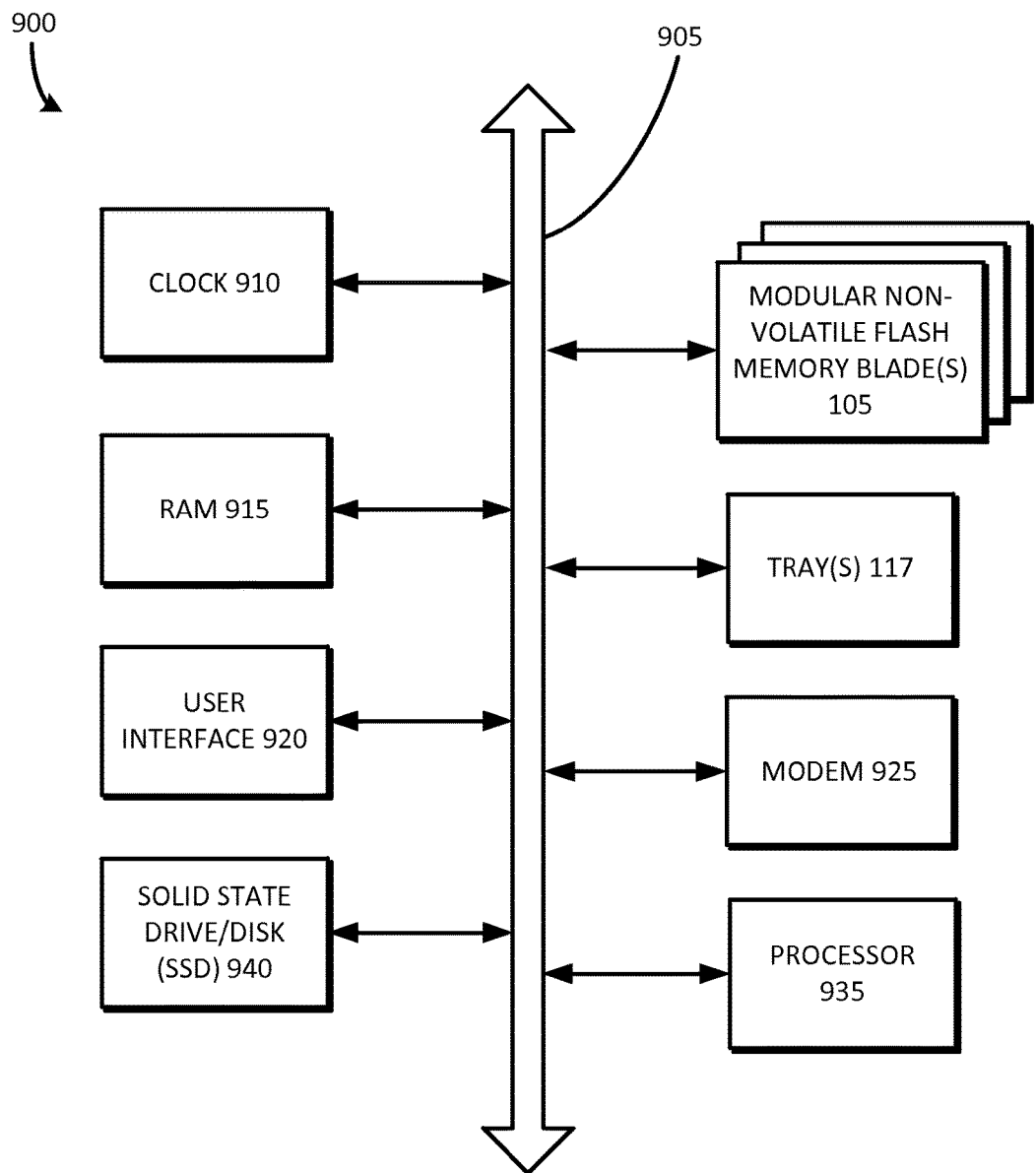
FIG. 9 is a block diagram of a computing system including one or more modular non-volatile flash memory blades of FIG. 1A.

FIG. 9 is a block diagram of a computing system 900 including one or more modular non-volatile flash memory blades 105 and tray 117 of FIG. 1A. The computing system 900 can include a clock 910, a random access memory (RAM) 915, a user interface 920, a modem 925 such as a baseband chipset, a solid state drive/disk (SSD) 940, and/or a processor 935, any or all of which may be electrically coupled to a system bus 905. The system bus 905 can be a high-speed bus and/or fabric. The modular non-volatile flash memory blade(s) 105 and tray(s) 117 can correspond to those described in detail above, and as set forth herein, and may also be electrically coupled to the system bus 905. The modular non-volatile flash memory blade(s) 105 can include or otherwise interface with the clock 910, the random access memory (RAM) 915, the user interface 920, the modem 925, the solid state drive/disk (SSD) 940, the processor 935, and/or the tray(s) 117.

The following discussion is intended to provide a brief, general description of a suitable machine or machines in which certain aspects of the inventive concept can be implemented. Typically, the machine or machines include a system bus to which is attached processors, memory, e.g., random access memory (RAM), read-only memory (ROM), or other state preserving medium, storage devices, a video interface, and input/output interface ports. The machine or machines can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines can include embedded controllers, such as programmable or non-programmable logic devices or arrays, Application Specific Integrated Circuits (ASICs), embedded computers, smart cards, and the like. The machine or machines can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth®, optical, infrared, cable, laser, etc.

Embodiments of the present inventive concept can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the inventive concept with reference to illustrated embodiments, it will be recognized that the illustrated embodiments can be modified in arrangement and detail without departing from such principles, and can be combined in any desired manner. And although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms can reference the same or different embodiments that are combinable into other embodiments.

Embodiments of the inventive concept may include a non-transitory machine-readable medium comprising instructions executable by one or more processors, the instructions comprising instructions to perform the elements of the inventive concepts as described herein.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

What is claimed is:

1. A modular non-volatile flash memory blade, comprising:
   a server motherboard including one or more processors coupled to a plurality of upstream ports;
   a mid-plane board including one or more power ports;
   one or more non-volatile flash memory blade multi-card modules wherein at least one includes:
      a switch;
      a module power port coupled to the one or more power ports of the mid-plane board, wherein the module power port is electrically coupled to the switch;
      an input/output port electrically coupled to the switch, and electrically coupled to a corresponding one of the upstream ports of the server motherboard; and
      six or more riser card slots configured to receive six or more solid state drive riser cards;
   one or more cable connector riser cards configured to be seated in a corresponding one of the upstream ports of the server motherboard; and
   one or more of cables configured to connect each of the upstream ports to a corresponding one of the input/output ports of a corresponding at least one of the non-volatile flash memory blade multi-card modules via a corresponding at least one of the cable connector riser cards,
   wherein:
   the six or more solid state drive riser cards are configured to be electrically coupled to the switch and to the module power port;
   each of the non-volatile flash memory blade multi-card modules is configured to communicate with the one or more processors via a corresponding at least one of the cables and a corresponding at least one of the cable connector riser cards;
   each of the six or more solid state drive riser cards are seated within a corresponding riser card slot from among the six or more riser card slots and are configured to communicate with the one or more processors of the server motherboard via the switch and the input/output port of a corresponding non-volatile flash memory blade multi-card module from among the one or more non-volatile flash memory blade multi-card modules;
   each of the six or more solid state drive riser cards includes a plurality of solid state drive chips configured to communicate with the one or more processors of the server motherboard via the switch and the input/output port of a corresponding non-volatile flash memory blade multi-card module from among the one or more non-volatile flash memory blade multi-card modules;
   the input/output port of each non-volatile flash memory blade multi-card module from among the one or more non-volatile flash memory blade multi-card modules is configured to be an upstream port;
   the switch of each non-volatile flash memory blade multi-card module from among the one or more non-volatile flash memory blade multi-card modules is configured to expand a corresponding upstream port from among the plurality of upstream ports into a plurality of downstream ports;
   each of the downstream ports of each non-volatile flash memory blade multi-card module from among the one or more non-volatile flash memory blade multi-card modules is associated with a corresponding chip from among the plurality of solid state drive chips;
   the upstream port of each non-volatile flash memory blade multi-card module from among the one or more non-volatile flash memory blade multi-card modules includes a peripheral component interconnect express (PCIe) X8 upstream port;
   the switch of each non-volatile flash memory blade multi-card module from among the one or more non-volatile flash memory blade multi-card modules includes a PCIe switch and is configured to expand the PCIe X8 upstream port into a plurality of PCIe X4 downstream ports;
   the six or more solid state drive riser cards of each non-volatile flash memory blade multi-card module from among the one or more non-volatile flash memory blade multi-card modules includes the six or more solid state drive riser cards seated within a corresponding riser card slot from among the six or more riser card slots;
   each chip from among the plurality of solid state drive chips of each of the six or more state drive riser cards of each non-volatile flash memory blade multi-card module from among the one or more of non-volatile flash memory blade multi-card modules is coupled to a corresponding PCIe X4 downstream port from among the plurality of PCIe X4 downstream ports;
   the one or more processors include a first processor and a second processor;
   the one or more upstream ports include first and second upstream ports;
   the one or more cable connector riser cards include first and second cable connector riser cards;
   the one or more cables include first and second cables;
   the first processor is coupled to a first subset of the first and second upstream ports;
   the second processor is coupled to a second subset of the first and second upstream ports;
   the one or more non-volatile flash memory blade multi-card modules include first and second non-volatile flash memory blade multi-card modules;
   the first non-volatile flash memory blade multi-card module is configured to communicate with at least one of the first processor or the second processor via the first cable, the first cable connector riser card, and the first upstream port;
   the second non-volatile flash memory blade multi-card module is configured to communicate with at least one of the first processor or the second processor via the second cable, the second cable connector riser card, and the second upstream port;
   the first upstream port is directly coupled to the first cable;
   the first cable is directly coupled to the first cable connector riser card;
   the first cable connector riser card is directly coupled to the first processor;
   the second upstream port is directly coupled to the second cable;
   the second cable is directly coupled to the second cable connector riser card; and
   the second cable connector riser card is directly coupled to the second processor.

* * * * *